April 28, 1925.
J. W. KUHN
1,536,022
COLLAPSIBLE CORE OR MANDREL
Filed June 28, 1924
2 Sheets-Sheet 1
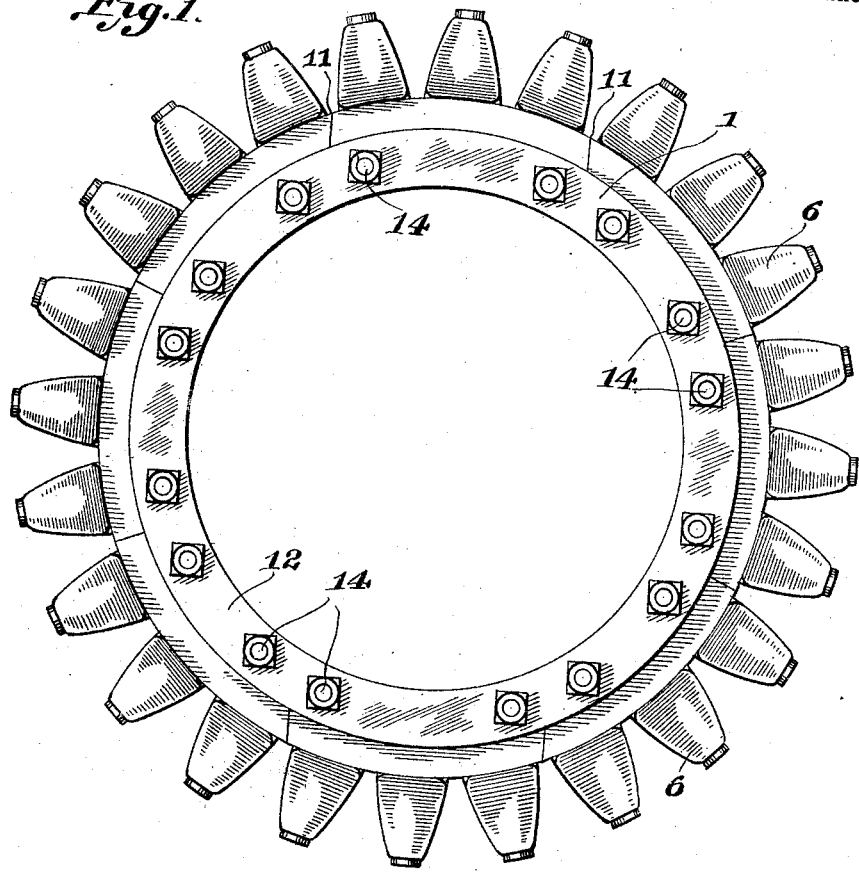
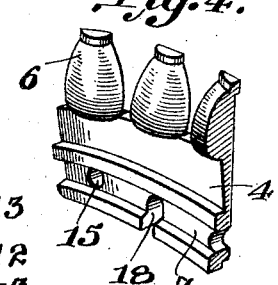
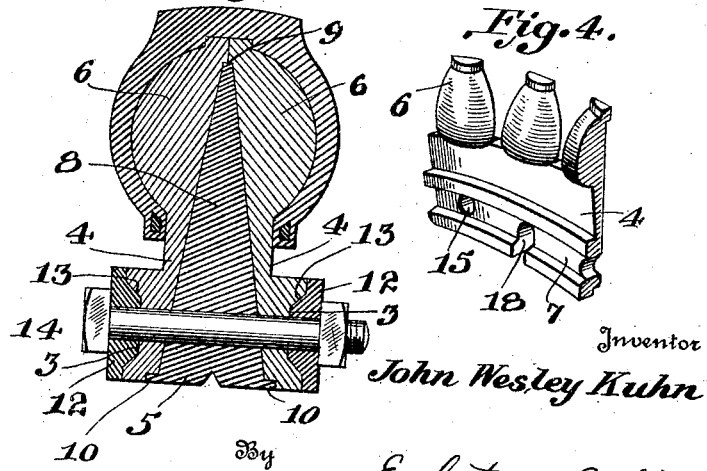
Inventor
John Wesley Kuhn
By
Eccleston & Eccleston
Attorneys April 28, 1925.
J. W. KUHN
1,536,022
COLLAPSIBLE CORE OR MANDREL
Filed June 28, 1924
2 Sheets-Sheet 2
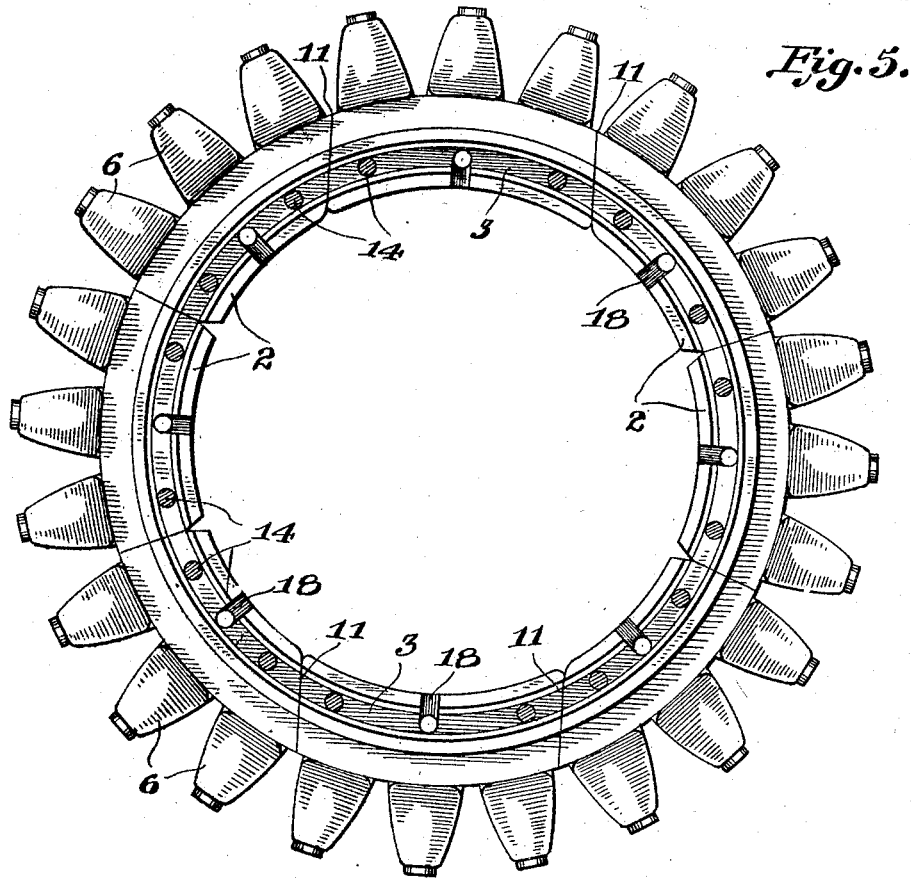
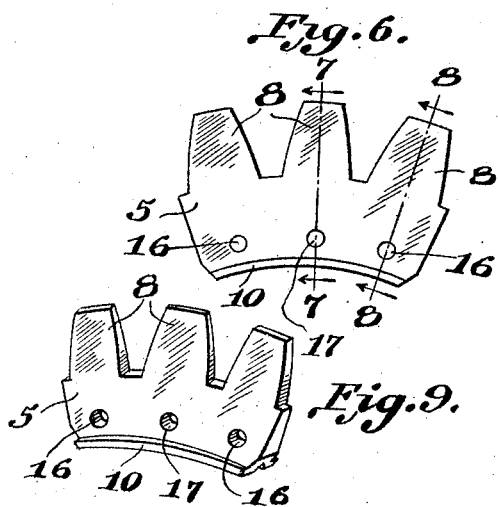
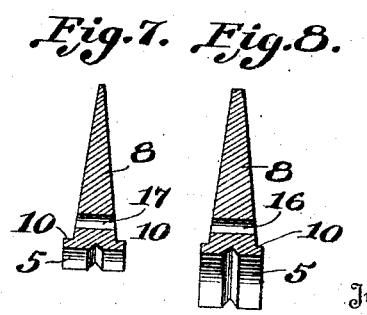
Inventor
John Wesley Kuhn
By Eccleston & Eccleston
Attorneys Patented Apr. 28, 1925.

1,536,022

UNITED STATES PATENT OFFICE.

JOHN W. KUHN, OF CHILLICOTHE, OHIO.

COLLAPSIBLE CORE OR MANDREL.

Application filed June 28, 1924. Serial No. 723,041.

*To all whom it may concern:*

Be it known that I, JOHN W. KUHN, a citizen of the United States, residing at Chillicothe, in the county of Ross and State of Ohio, have invented certain new and useful Improvements in Collapsible Cores or Mandrels, of which the following is a full, clear, and exact description.

This invention relates to collapsible cores or mandrels designed for use in the manufacture of cushion tires such as disclosed in my copending application Serial No. 723,042, filed June 28, 1924, and has for its object to provide a sectional core including master keys and wedges which will permit of a ready collapsing of the core to facilitate withdrawal thereof from the interior of the finished tire without distortion of the beads and without undue effort.

A further object of the invention resides in the provision of a core which may be quickly and easily assembled in preparation for the molding of a tire.

Other objects and advantages of the invention will be apparent from the following description when taken in connection with the accompanying drawings in which, Figure 1 is a side elevation of the core completely assembled.

Figure 2 is a transverse section through the core.

Figures 3 and 4 are fragmentary perspective views of certain of the core elements.

Figure 5 is a side elevation of the core with the locking rings removed.

Figure 6 is a side elevation of one of the locking keys or wedges.

Figures 7 and 8 are sections taken on lines 7—7 and 8—8 respectively of Figure 6, and Figure 9 is a perspective view of the said locking key or wedge.

Referring to the drawings more in detail, the numeral 1 indicates a complete core or mandrel on which it is intended that the tire be built up and then molded. The core is shown as composed of eight units of which two are master keys, although a greater number of units may be employed if found desirable. These units are indicated generally by the numeral 2 and the master keys by the numerals 3.

Each unit of the core or mandrel 1 is composed of three sections, namely, the two outer sections 4 and the intermediate section or locking key 5. The outer sections are each composed of a body portion on which are formed three knobs or protuberances 6 which are substantially semi-conical in shape, and the body portion is also formed with an arc-shaped channel or groove 7 for a purpose to be later described. The intermediate section or locking wedge 5 of each unit 3 is provided with three tapered fingers 8 of which the center finger is slightly thinner than the outer fingers in order that the outer sections may collapse to a position in which they may be withdrawn without seriously interfering with the beads of the tire.

The inner surfaces of the knobs 6 are provided with shoulders 9 adjacent their upper ends and shoulders 10 at their lower ends, the former to engage the upper ends of the wedge members 5 and the latter to cooperate with the flanges 10 on the enlarged ends of said wedges. By this construction it will be obvious that the wedge member 5 may be moved into its exact position and will be prevented from passing too far into the core and thus expanding the same beyond its intended size.

All of the several units of the core are identical except that the master key units 3 have their ends tapered as indicated by numeral 11 in order that the same may be drawn inwardly of the core at the beginning of the collapsing operation.

In assembling the core the outer members 4 of a section are first put in place and the wedge 5 is then inserted, the key unit 3 of course being the last unit to be put in position. When thus assembled the rings 12 provided with annular ribs 13 adapted to seat in the annular grooves 7 of the several units are bolted to the sides thereof by means of bolts 14 and to this end the sections 4 are provided with bolt receiving apertures 15 and the wedge sections 5 with bolt receiving apertures 16. By this construction it will be apparent that the sections 4 are securely locked against any relative movement.

For the purpose of inserting a tool for withdrawing the wedge sections 5 when necessary, I have provided a central aperture 17 therein and the outside sections 4 are provided with notches 18 for permitting an inward movement of the tool in withdrawing the wedge.

In dismantling a tire the first step will be to remove the bolts 14 and locking rings 12. A tool will then be inserted in the aperture 17 of the wedge member 5 of one of the master keys and this member will be withdrawn toward the center of the core. When this element is removed the upper one of the side sections 4 of the master key will drop into a position in which it may be readily withdrawn through the space between beads of the tire, and the lower side section may then be withdrawn in the same manner. The master key 3 being removed it will be understood that each of the other units may be withdrawn in a similar manner until the entire core is removed.

From the foregoing description it will be seen that I have devised a core or mandrel for cushion tires which may be easily and quickly assembled or collapsed, and one in which the various elements are securely locked against relative movement when in use.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. A collapsible core or mandrel composed of a plurality of units, each unit composed of two outer sections and an intermediate section, semi-cone-shaped protuberances extending radially from each of said outer sections, and wedge-shaped fingers extending radially from said intermediate section and adapted to engage the inner faces of said protuberances.

2. A collapsible core or mandrel composed of a plurality of units, each unit composed of two outer sections and an intermediate section, said intermediate section provided with a transverse aperture, and said outer sections provided with notches in alignment with said aperture, whereby a tool may be inserted in said aperture so as to withdraw the intermediate section from between the outer sections.

JOHN W. KUHN.